(12) United States Patent
Toksvig et al.

(10) Patent No.: US 11,017,585 B1
(45) Date of Patent: May 25, 2021

(54) SYSTEMS AND METHODS FOR CAPTURING IMAGE DATA FOR RECREATION IN A VIRTUAL ENVIRONMENT

(71) Applicant: Facebook, Inc., Menlo Park, CA (US)

(72) Inventors: Michael John Toksvig, Palo Alto, CA (US); Brian Keith Cabral, San Jose, CA (US); Joyce Hsu, Oakland, CA (US); Andrew Hamilton Coward, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 114 days.

(21) Appl. No.: 16/005,555

(22) Filed: Jun. 11, 2018

(51) Int. Cl.
  *G06T 15/20* (2011.01)
  *H04N 5/232* (2006.01)
  *H04N 5/247* (2006.01)
  *G06T 15/06* (2011.01)

(52) U.S. Cl.
  CPC ............ *G06T 15/205* (2013.01); *G06T 15/06* (2013.01); *H04N 5/23296* (2013.01); *H04N 5/247* (2013.01)

(58) Field of Classification Search
  CPC ... G06T 15/205; G06T 15/06; H04N 5/23296; H04N 5/247
  See application file for complete search history.

(56) References Cited

U.S. PATENT DOCUMENTS

| | | | |
|---|---|---|---|
| 10,055,898 B1 * | 8/2018 | Wang | G06T 7/262 |
| 10,460,500 B1 * | 10/2019 | Hunt | G06T 15/005 |
| 2004/0073578 A1 * | 4/2004 | Nam | G06F 16/29 |
| 2006/0094955 A1 * | 5/2006 | Satoh | G01S 5/163 |
| | | | 600/426 |
| 2012/0033077 A1 * | 2/2012 | Kitaura | G06T 7/55 |
| | | | 348/148 |
| 2014/0071234 A1 * | 3/2014 | Millett | H04N 13/271 |
| | | | 348/43 |
| 2016/0119541 A1 * | 4/2016 | Alvarado-Moya | G06T 3/4038 |
| | | | 348/38 |
| 2017/0201689 A1 * | 7/2017 | Zilberman | H04N 21/21805 |
| 2017/0294006 A1 * | 10/2017 | Cabral | G06K 9/209 |
| 2017/0351900 A1 * | 12/2017 | Lee | H04N 5/2257 |
| 2018/0035968 A1 * | 2/2018 | Yamahana | A61B 5/0077 |
| 2018/0202798 A1 * | 7/2018 | Hernandez Serrano | |
| | | | G01B 11/14 |
| 2019/0098277 A1 * | 3/2019 | Takama | G06T 17/00 |
| 2019/0197715 A1 * | 6/2019 | Rebecq | G06T 15/20 |

(Continued)

*Primary Examiner* — Antoinette T Spinks
(74) *Attorney, Agent, or Firm* — Baker Botts L.L.P.

(57) ABSTRACT

In one embodiment, a method includes a computing system which may receive captured image data from a camera assembly. The camera assembly may include one or more cameras and an actuator to move the cameras. The image data may include frames that were captured while the actuator was moving the cameras. The computing system may determine for each frame, the time and position of the camera at the point that the image data was captured. The computing system may then generate an index of the captured image data and the associated time and position data. The index may be utilized for reconstructing the scene around the camera assembly from a viewpoint which is different from the viewpoint of any one of the cameras. This reconstruction may be performed based on one or more frames of the captured image data queried using the index, the viewpoint, and a time of interest.

21 Claims, 11 Drawing Sheets

(56) References Cited

U.S. PATENT DOCUMENTS

| | | | | |
|---|---|---|---|---|
| 2019/0279418 A1* | 9/2019 | Sakakima | ................ | H04N 7/18 |
| 2019/0364265 A1* | 11/2019 | Matsunobu | ...... | H04N 21/21805 |
| 2019/0371030 A1* | 12/2019 | Roesler | .................. | G06T 15/06 |
| 2020/0005521 A1* | 1/2020 | Youngquist | ............... | G06T 7/20 |
| 2020/0329189 A1* | 10/2020 | Tanaka | .................... | G06T 17/20 |

* cited by examiner

SYSTEMS AND METHODS FOR CAPTURING IMAGE DATA FOR RECREATION IN A VIRTUAL ENVIRONMENT

TECHNICAL FIELD

This disclosure generally relates to computer graphics.

BACKGROUND

Conventional cameras operate by exposing a light sensitive medium (photographic plate or film for a traditional camera, an electronic image sensor for a video or digital camera) to a light source and recording that light source onto the medium. In all conventional embodiments of a camera, the captured images are static relative to the point of view of the camera. For example, a still photo taken in a forest will only ever show a single static representation of the flora and fauna in that forest. Similarly, while video cameras present a dynamic element in that they operate by capturing many images in sequence, each of those images is static relative to the point of view of the camera just like a still photo would be. Unless a camera operator has taken a photo or video from an exact, particular angle, image data from that angle will never be available. For example, if a viewer is viewing a static photo but wants to see the same scene from a slightly different angle or wants to see behind an object in the picture that is blocking view, the viewer may attempt to shift their position to change perspective. In this example, using a conventional static photo, the image will not appear differently, and any part of the scene hidden by the blocking object will remain hidden.

Conventional cameras normally have a field of view ranging from a few degrees, to, at most, 180 degrees. In contrast, an ideal omnidirectional camera (or 360 camera) has a field of view which captures light from all directions falling onto a focal point. In practice, most omnidirectional cameras cover less than the full sphere field of view, and many only capture a hemisphere of view (360 degrees along the equator of the sphere but excluding the top and bottom of the sphere).

Like conventional cameras, the images produced by omnidirectional cameras are static relative to the point of view of the camera. In other words, while an ideal omnidirectional camera may provide images showing the full field of view from a single focal point, an image taken with an omnidirectional would no longer accurately represent the subject matter of the image if the viewer of the image wants to shift their perspective even slightly.

SUMMARY OF PARTICULAR EMBODIMENTS

Particular embodiments described herein relate to techniques that enable a scene to be dynamically reconstructed based on current viewing positions. To support reconstruction, embodiments of this invention contemplate the simultaneous use of multiple cameras to collect image data of a scene from different viewpoints. One goal of certain embodiments may be to capture sufficient data to enable a replay system to recreate the surrounding environment based on dynamically changing viewpoints, even if the viewpoints include ones that do not coincide with any single camera's position during recording.

To aid in the capture of a scene from different viewpoints, multiple cameras may be used. As the number of cameras increases, so too increases the amount of image data (and the corresponding scene coverage and diversity of camera viewpoints) captured during each unit of time. In some embodiments, the cameras may rotate, nod, bob, move laterally, or otherwise move to allow for greater angular and spatial coverage (the amount of the surrounding environment which is captured by the one or more cameras) of the surrounding environment. The speed or patterns with which the cameras move may be adjusted in time to further improve coverage and reduce sparsity. In some embodiments, each recorded frame may be indexed by the position of the camera that captured the frame and the particular time at which it was captured. That index may then be used to query the pixel collected by a particular camera at a particular angle as needed. For example, when the surrounding environment is being recreated from a particular viewpoint, the system may project a ray from the viewpoint towards each pixel of interest. Based on the ray's trajectory, the system may use the index to identify a particular camera that was at the right place and at the right time to capture the pixel that coincides with the ray. In a similar manner, other pixels of interest may be retrieved using the indexed frames. The collection of pixels of interest gathered in this manner may be used by the system to reconstruct the captured scene for a user at the particular viewpoint.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
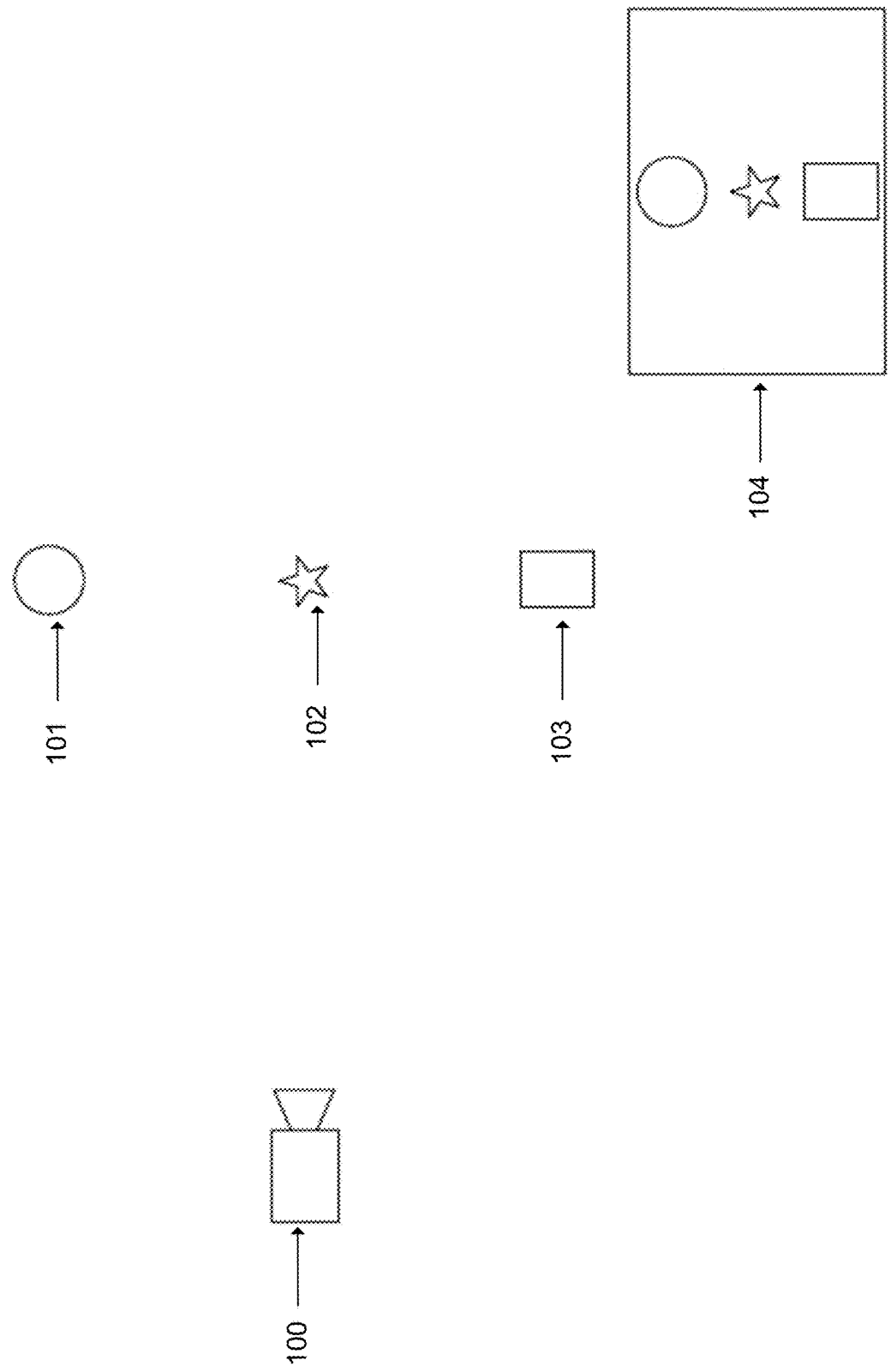
FIG. 1 illustrates an example of a setup, including an example field of view as would be produced with a conventional camera.

FIG. 1 illustrates an example of a setup, including an example field of view as would be produced with a conventional camera. The camera 100 is facing towards objects of interest 101, 102, and 103. The field of view of camera 100, represented as 104, shows the three objects of interest.

Figure 2:
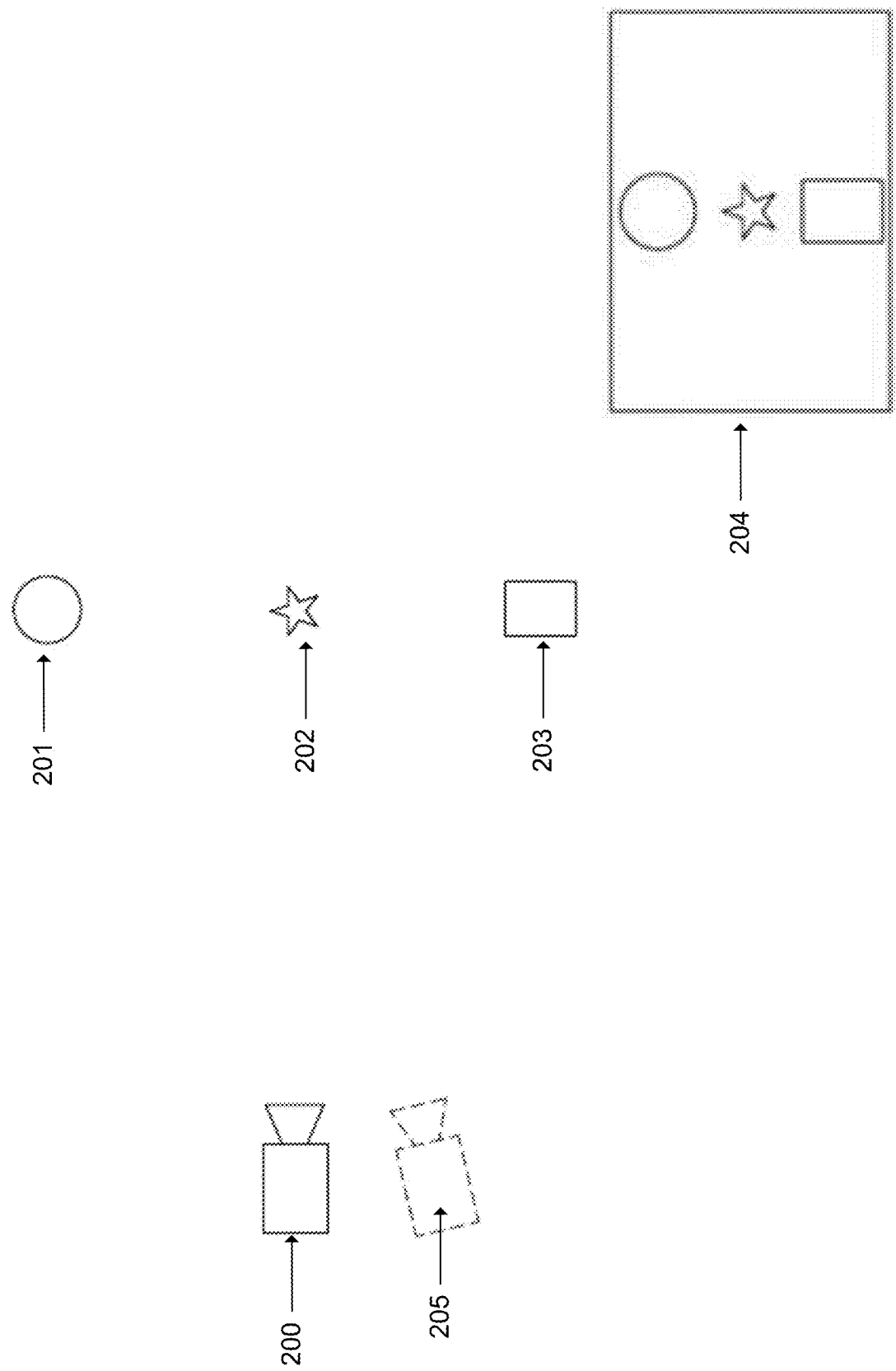
FIG. 2 illustrates an example of a setup, including a virtual camera and a virtual field of view as would be produced with a conventional camera.

FIG. 2 illustrates an example of a conventional system, including conventional camera 200, objects of interest 201, 202, and 203, and field of view 204. Also represented is virtual camera 205, which is may be understood to be a user who is viewing the objects of interest, but from a slightly different perspective than that captured by the camera 200. Because image data is only being captured by camera 200 from one perspective, what the user sees from the perspective of virtual camera 205 will be identical to the field of view 104 captured by camera 200, as shown in from FIG. 1, despite the change in position or perspective of virtual camera 205. It should be understood that this image will remain static, regardless of the position or perspective of the viewer/virtual camera, but will only be accurate if the virtual camera's 205 perspective directly matches that of the camera 200.

Figure 3:
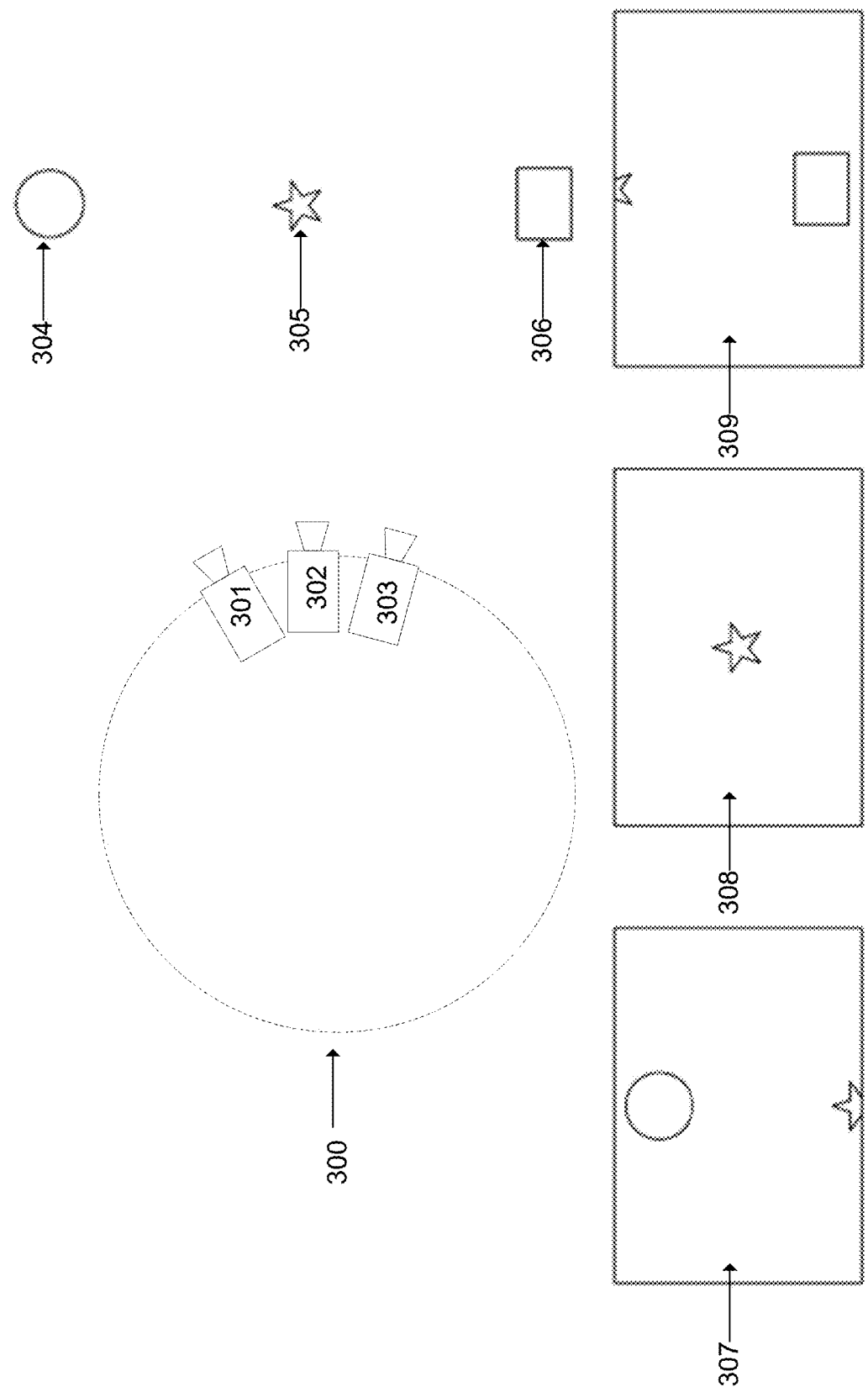
FIG. 3 illustrates an example of an assembly consisting of multiple cameras, each camera with its own distinct position and field of view.

Particular embodiments described herein address the aforementioned shortcomings of conventional cameras by using multiple cameras to capture a scene and using the captured images to dynamically reconstruct an image of the scene as seen from a particular viewpoint. FIG. 3 illustrates an example of an assembly consisting of multiple cameras, each camera with its own distinct position and field of view. In this example, camera assembly 300 consists of three cameras, 301, 302, and 303. All three cameras are pointed toward objects of interest 304, 305, and 306. Each of the cameras 301, 302, and 303 has a field of view represented as 307, 308, and 309, respectively. The field of view of each camera may capture one or more of the objects of interest from a distinct perspective from that of the other two cameras. In this example, camera 301 captures object of interest 304 and the upper half of object of interest 305. Camera 302 captures object of interest 305. Camera 303 captures object of interest 306 and the lower half of object of interest 305. Additionally, it should be understood that in as much as there is overlap in the field of view of the cameras, the objects of interest captured by multiple cameras will be captured at different angles. For example, camera 301 will capture the upper half of object of interest 305 from a more severe or inclined angle than camera 302.

Embodiments of the invention may include moving cameras 301, 302, and 303 such that they rotate, nod, sweep, move laterally, or otherwise move to capture images of the objects of interest from additional positions or perspectives. Embodiments of the invention may include capturing images with each of the cameras and storing them in an index. For each image, a time at which the image was captured and position information corresponding to the camera that captured it may be determined. Position information may include the position of the camera with respect to the other cameras, objects of interest, or the environment surrounding the camera assembly. Position information may also include a displacement from a starting or stationary position, a speed of the camera, an acceleration of the camera, a direction of movement of the camera, or any other information which could be used to determine the position and perspective of a camera at a time that an image was captured. It should be understood that embodiments of the invention may require for position information to be separately recorded for each individual camera. In other embodiments, position information may only need to be recorded for the camera assembly, from which position information for each camera may be determined.

Figure 4:
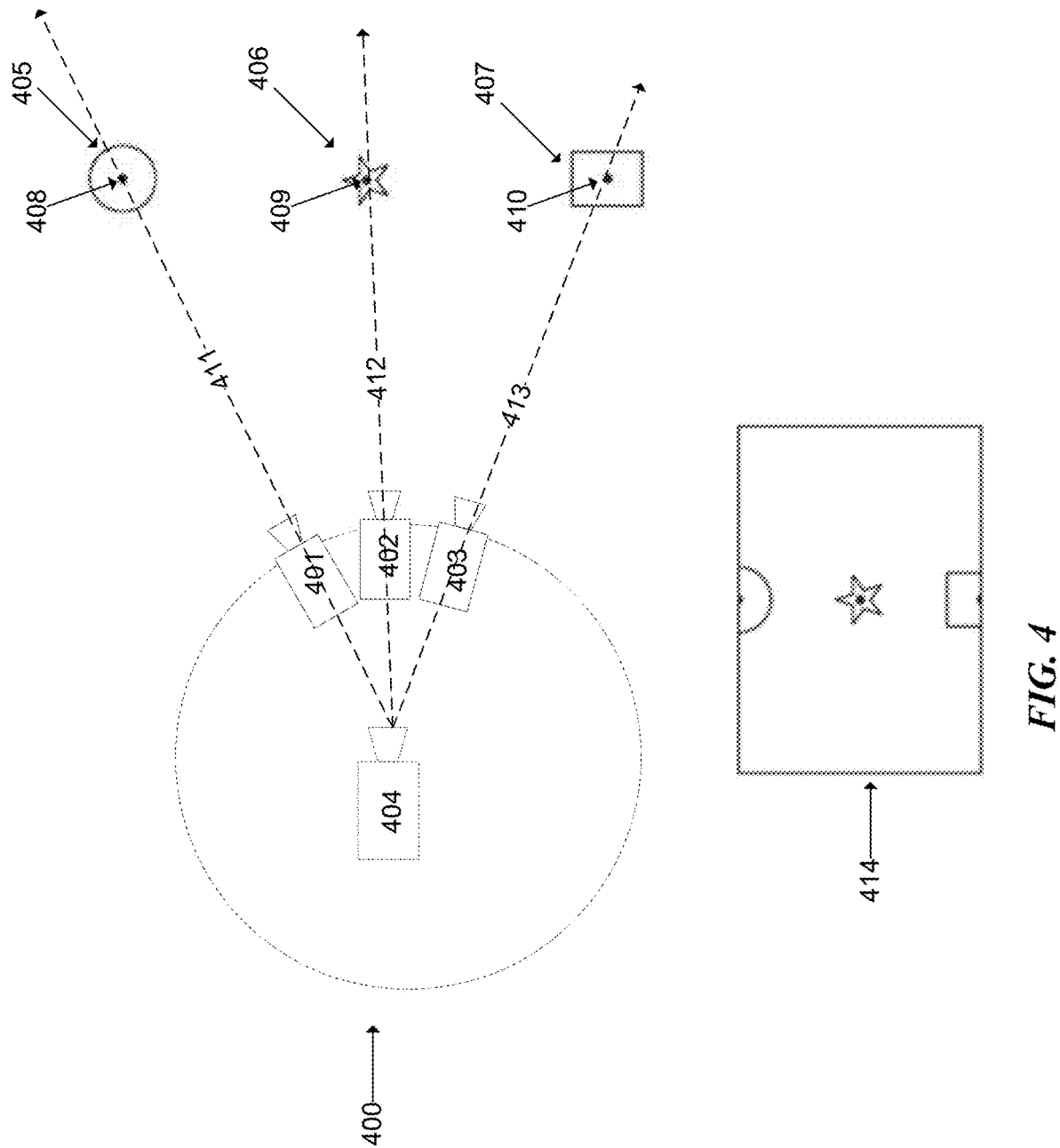
FIG. 4 illustrates a first embodiment in which multiple cameras may be used to recreate a virtual field of view of a virtual camera.

FIG. 4 illustrates a first embodiment in which multiple cameras may be used to recreate a virtual field of view of a virtual camera. The virtual camera may correspond to a user or viewer of the scene captured by the camera assembly. It should be understood that the virtual camera represents a viewpoint and does not exist in reality. The virtual field of view is a field of view that is desired by a user of an embodiment of the invention and is one that was not directly or perfectly captured by any one of the real cameras (e.g., 401, 402, and 403). In this embodiment, each of real cameras 401, 402, and 403 may be attached to a camera assembly 400. Each real camera, as well as virtual camera 404 are pointed generally towards objects of interest, 405, 406, and 407. Individual points of interest, captured by the real cameras as single pixels in the captured images, are represented by 408, 409, and 410. The captured image information may be stored and indexed, as described elsewhere herein, and subsequently used to reconstruct an image of the captured scene from a particular viewpoint.

During operation, a computing system configured for scene-reconstruction in accordance with particular embodiments may be given a viewpoint of interest, which may be represented by a virtual camera 404 with an associated field of view. In particular embodiments, the system may also be given a particular time of interest (e.g., the system may be asked to reconstruct an image of a scene as viewed from a particular viewpoint and at a particular time). To determine what should be visible within the field of view of the virtual camera 404, the computing system may project rays from the virtual camera 404 into virtual space. The trajectory of rays, such as representative rays 411, 412, and 413, span from the points of interest, through the real cameras, and back to virtual camera 404. 414 shows the virtual field of view of virtual camera 404, including the objects and associated points of interest. If, for purposes of this example, the real cameras and the virtual camera are assumed to have the same breadth/width of field of view, any single real camera would be unable to capture the same virtual view of virtual camera 404. As is shown, real camera 401 would be too high to capture at least point of interest 410, real camera 402 would be too close to the points of interest to capture points of interest 408 and 410, and real camera 403 would be too low to capture at least point of interest 408. However, when taken together, the images captured by the real cameras would encompass the information needed to reconstruct an image of the scene from the viewpoint of the virtual camera 404.

An embodiment of the invention may include recreating the virtual field of view 414 of virtual camera 404 by selecting individual pixels captured within the field of view of one or more real cameras and aggregating those pixels to recreate an image of the scene that would have been visible within the virtual field of view 414 of the virtual camera 404. In some embodiments, this may be achieved by shooting a ray, for example 411, towards each pixel in the virtual/display screen of the virtual camera 404 and determining what objects within the scene are visible (e.g., the ray 411 may intersect point of interest 408) from virtual camera 404. Based on the trajectory of the ray and the index of images collected by the real cameras, embodiments of the invention may determine that camera 401 was in the best position (and at the right time, if the scene reconstruction has a temporal dependency) to capture point of interest 408, since the camera's 401 field of view at that position intersects the ray's trajectory. Embodiments of the invention may then determine which specific pixel (or groups of pixels) from the image captured by that camera should be used to generate the reconstructed image. For example, the computing system may determine where ray 411, which was shot between virtual camera 404 and point of interest 408, intersects the images if it were positioned within the field of view of real camera 401. This intersection point may correspond to an individual pixel from a frame of image data and with a known location on the field of view of real camera 401. Based on the indexed time and position data, this pixel may then be retrieved from the index and used in the virtual field of view.

This process may then be iteratively repeated for each other pixel in the virtual field of view. For example, ray 412 may be shot from the virtual camera 404 to another pixel and conceptually intersect with point of interest 409, the color information of which is captured by one or more of the real cameras. Based on the trajectory of ray 412, embodiments of the invention may determine that camera 402 was in the best position to capture point of interest 409. Embodiments may then determine which pixel from which frame of the image data captured by camera 402 captures the point of interest from the position and perspective most appropriate for use in virtual field of view 414. Similarly, ray 413, may be used to determine that camera 403 was in the best position to capture point of interest 410, and the best pixel may be selected and provided for display in virtual field of view 414. It should be understood that this process may be completed many times, once for each pixel or each group of pixels (e.g., a coherent bundle of 4, 8, or 16 pixels) in the virtual field of view. Additionally, the virtual field of view may shift as a user or viewer shifts their position or perspective, in which case the full process of selecting pixels from individual frames of image data for use in the virtual field of view may begin again. In some embodiments, the process of selecting pixels from image data to include in the virtual field of view may happen concurrently, that is every pixel may be selected at the same time. It should be understood that the camera assembly 400 may include any number of additional cameras, and that there exist an infinite number of virtual cameras, each of which would have its own, unique virtual point of view.

Figure 5:
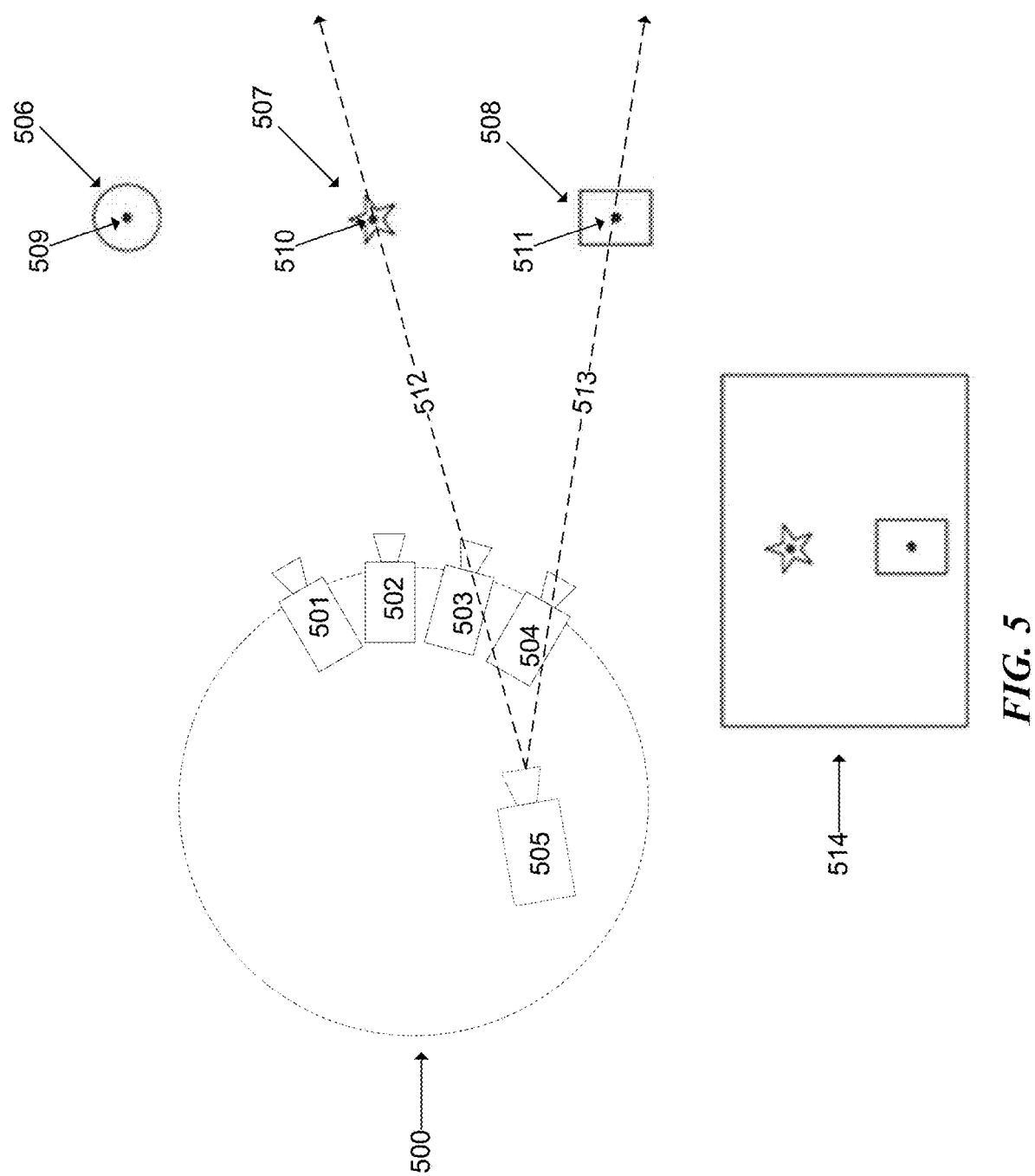
FIG. 5 illustrates a second embodiment in which multiple cameras may be used to recreate a virtual field of view of a virtual camera.

FIG. 5 illustrates a second embodiment in which multiple cameras may be used to recreate a virtual field of view of a virtual camera. In this example, camera assembly 500 consists of at least four cameras, 501, 502, 503, and 504. As compared to virtual camera 404 from FIG. 4, virtual camera 505 has shifted slightly. In this embodiment the shift is represented as being to the right from the position of the virtual cameras in previously described embodiments. In this embodiment, the real and virtual cameras are once again pointed generally towards three objects of interest, represented as 506, 507, and 508. Points of interest within the objects of interest are represented as 509, 510, and 511. Rays 512 and 513 extend from virtual camera 505 and to points of interest 510 and 511. Point of interest 509, also shown, is not within the virtual field of view 514 and thus does not have a ray extending to it.

Based on the trajectory of the rays, individual pixels can be selected from image data captured by the one or more cameras. In this embodiment, camera 502 may be determined to have been in the best position to capture point of interest 510, and camera 504 may be determined to have been in the best position to capture point of interest 511. Embodiments of the invention may then determine which frames from the image data captured by cameras 502 and 504 correspond to the camera and position that best captured the points of interest. Based on the time and position data, embodiments may determine rays 512 and 513 intersect the field of views of the corresponding real cameras. These intersection points may correspond to individual pixels which then may be provided for use in reconstructing the image within virtual field of view 514. The reconstructed image for virtual camera 505 includes a portion of the scene that is visible and expected from the viewpoint of virtual camera 505, even though no single real camera captured the same scene from the same vantage point.

Figure 6:
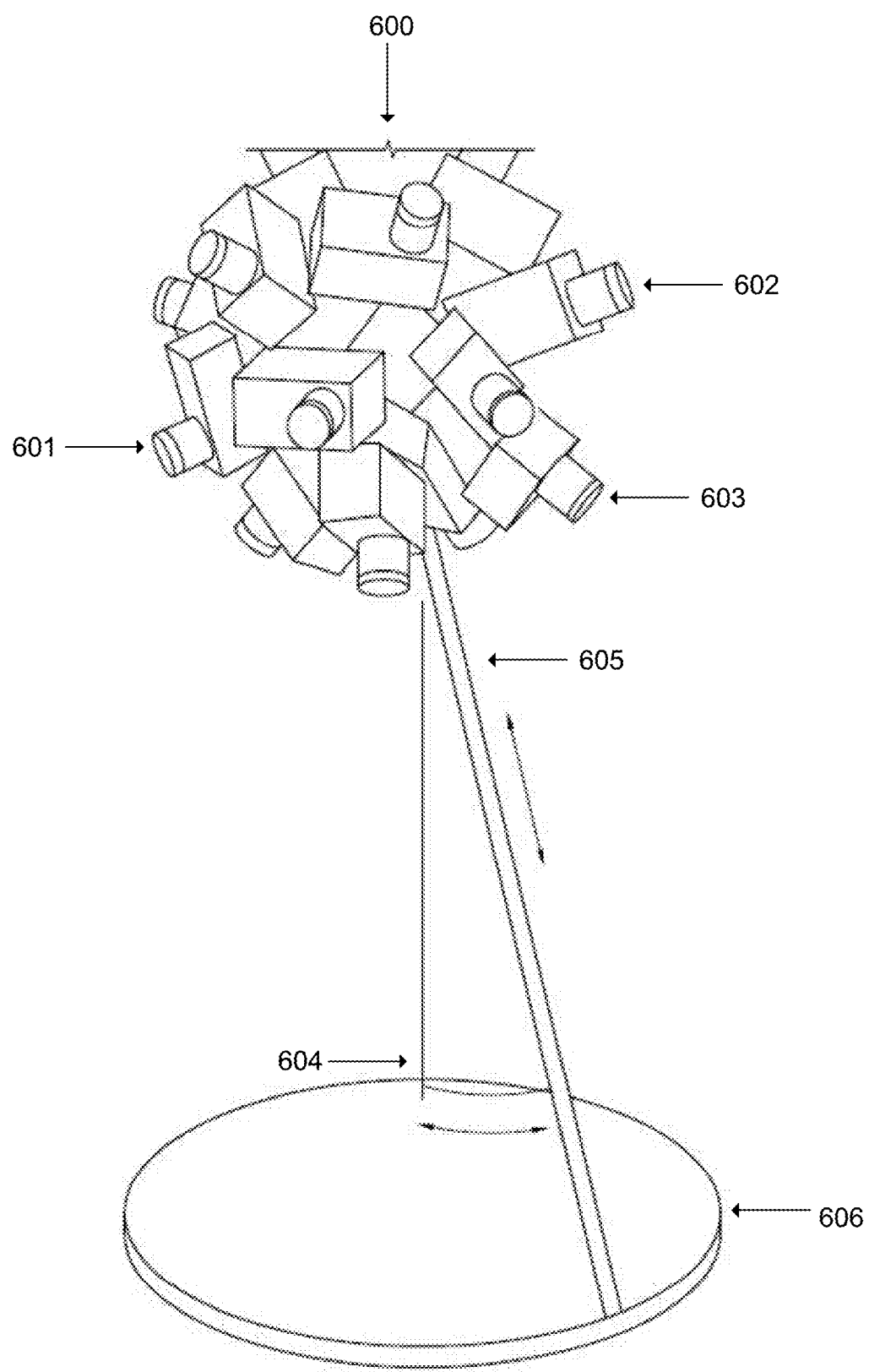
FIG. 6 illustrates an example apparatus, consisting of multiple cameras, facing generally outward, and an actuator, which may be used to perform embodiments of the invention.

FIG. 6 illustrates an example apparatus or camera assembly 600, consisting of multiple cameras (e.g., 601, 602, and 603) facing generally outward and an actuator 604, which may be used to perform embodiments of the invention. In some embodiments, the actuator may be a mechanical device configured to control the movement of the camera. The actuator may include a pole 605 and a base 606. In some embodiments, the actuator 604 may consist of only a single element and may not necessarily comprise multiple distinct components. In other embodiments, the pole 605 may include the element upon which the camera assembly is extended, and the base 606 may include the element that contacts the floor or some other surface for stability. In some embodiments the apparatus may include only one camera. In other embodiments, the apparatus may include a plurality of cameras. The cameras may be arranged in a generally spherical shape. The cameras may be in fixed, known, and/or equidistant locations with respect to one another and/or a central point. As the number of cameras increases, the spatial and angular coverage increases, allowing for greater amounts of image data to be captured in a given amount of time. Increasing the amount of image data that can be captured in a given amount of time provides multiple advantages, namely wider coverage of the surrounding environment, faster image capture of a static environment and greater capacity to capture movement within a dynamic environment. It should be understood that, as used throughout this application, "camera assembly" may mean the grouping of one or more cameras and an actuator. Alternatively, "camera assembly" may mean only the one or more cameras, distinct from the actuator.

The actuator 604 may be configured to allow for the one or more cameras to rotate, bob, nod, move laterally, or move in any other mode or direction as needed. In some embodiments the base 606 may also be configured to allow for one or more cameras to rotate, move laterally, or move in any other mode or direction as needed. As an example, in some embodiments the base may be configured to rotate around a vertical axis. In some embodiments the base may include features to allow for laterally movement (e.g., tracks or wheels). In some embodiments, some modes of movement may be less obtrusive or obvious than others. In some embodiments, the actuator 604 may be a mechanical device. Movement achieved by the actuator 604 may include a bobbing action, achieved by causing the cameras to rise and fall along the actuator pole 605. Alternatively, or in conjunction, in some embodiments, the cameras may nod from their position at the top of the actuator pole, which may result in the cameras sweeping vertically. In some embodiments, the pole 605 may rotate along its axis. In some embodiments, the camera assembly may be mounted such that it is at an inclined angle with respect to the base. This may be achieved by mounting the pole 605 at an angle with respect to the base 606. In some embodiments, the base may also rotate along its axis, thereby causing the one or more cameras to also rotate along the base's axis. It should be understood that in some embodiments, including those in which multiple modes of movement are utilized, the paths of the one or more cameras may be complex such that the combined paths of all cameras may provide complete or nearly complete spatial coverage my the one or more cameras. For example, in an embodiment the camera assembly 600 may be mounted on a pole that rotates along its axis and is tilted 20 degrees off vertical. The rotating pole, along with above the camera assembly (or portion thereof) rotating around its vertical axis, may cause each camera to sweep in a circle that is 20 degrees off horizontal. Additionally, the base 606 may rotate along its axis at a speed which may vary from the speed at which the pole 605 may rotate, thereby resulting in a complex pattern of spatial coverage and complete or nearly complete spatial coverage by the cameras. This affect is described in greater detail in FIG. 9. It should be understood that embodiments of this invention include any possible mode of movement, and all possible combinations of those modes of movement, as necessary, to provide increased or ideal spatial coverage. In some embodiments, this may include rotating around a vertical axis, rotating around the pole 605 (the pole may not be vertical), bobbing up and down, bobbing along the axis of the pole 605, nodding around a horizontal axis, nodding along a non-horizontal axis that goes through the center of the sphere. Furthermore, in some embodiments, certain modes of movement may be preferable if they are less obtrusive or obvious. For example, rotation and nodding around an axis that goes through the center of the camera assembly 600, may be less noticeable than other modes of movement and therefore preferable. Similarly, some modes of movement (e.g., nodding) may be preferable over other modes of movement (e.g., rotating) due to mechanical constraints (e.g., wires getting wrapped around the device over time).

Figure 7A:
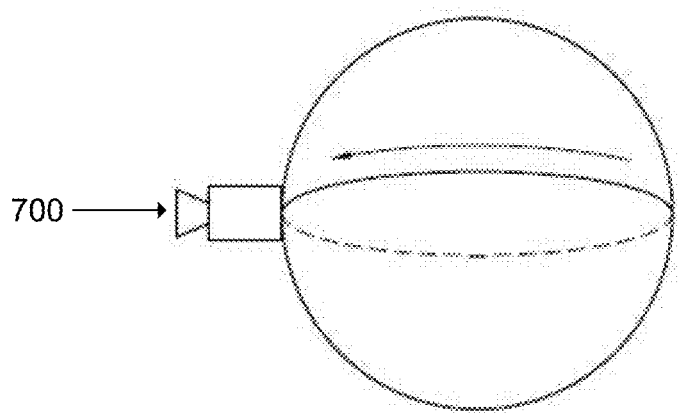
FIG. 7a illustrates an embodiment of the invention in which a single camera with a field of view of only one pixel is rotated around a single axis.
Figure 7B:
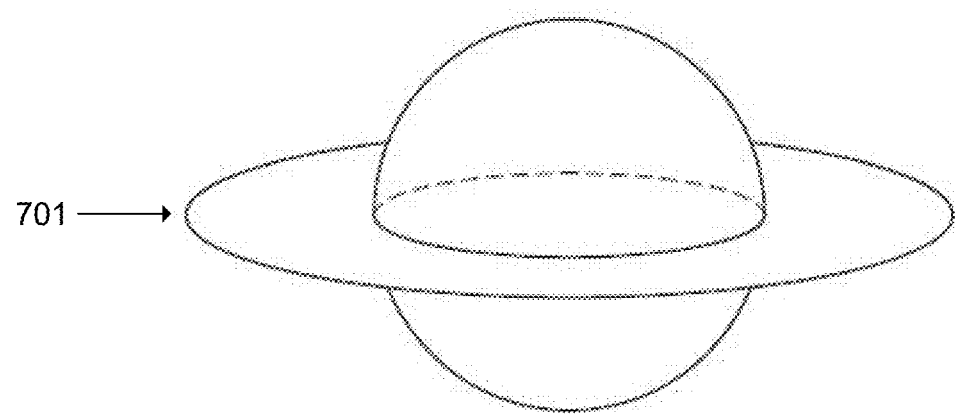
FIG. 7b illustrates the limited spatial coverage produced by an embodiment utilizing a single rotating camera with a limited field of view.

FIG. 7a illustrates an embodiment of the invention in which a single camera 700 with a field of view of only one pixel is rotated around a single axis. In this example embodiment, the spatial coverage would be limited to whatever image data can be captured by the single camera's lens (or its field of view) as it rotates around the axis. In some embodiments, wide angle cameras may be used to increase the amount of image data that can be captured. However, as the angle increases, distortion of the image increases and resolution suffers. As a result, high resolution cameras with a relatively limited field of view may be preferable. The limited spatial coverage that may be provided by an embodiment utilizing a single camera with a limited field of view is illustrated by FIG. 7b. In FIG. 7b, the spatial coverage of the camera 700 from FIG. 7a is represented as the disk 701.

Figure 8A:
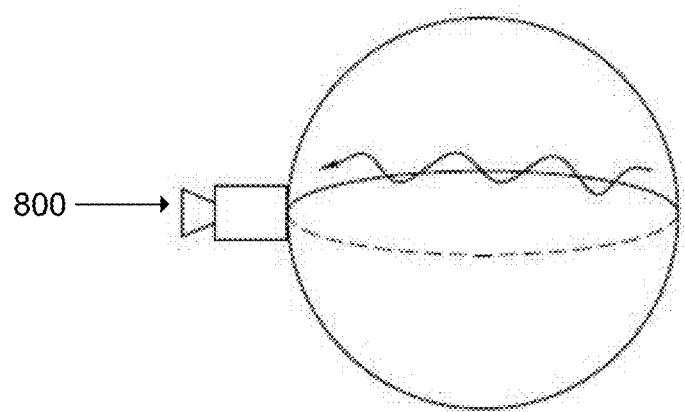
FIG. 8a illustrates an embodiment of the invention in which a single camera with a field of view of only one pixel nods up and down as it rotates around an axis.
Figure 8B:
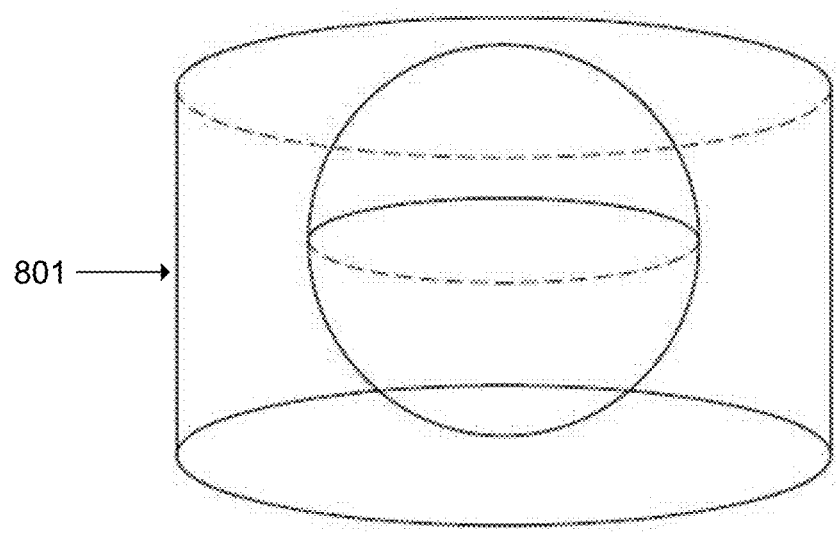
FIG. 8b illustrates the increased spatial coverage produced by the introduction of nodding motion.

FIG. 8a illustrates an embodiment of the invention in which a single camera 800 with a field of view of only one pixel nods up and down as it rotates around an axis. The addition of nodding motion may allow for increased spatial coverage and thus increased image data that can be captured. If the nodding motion and rotational motion is conducted at a constant speed, the apparatus may fall into a cyclical pattern (e.g., one nod every 180 degrees of rotation) which may limit the spatial coverage. As such, it may be beneficial to vary the speed or acceleration of one or both modes of movement of the apparatus. For example, each camera may be configured to nod based on the pole's rotation (e.g., the pole may be configured to perform a 180-degree rotation with a 6-second interval) and sweep based on the base's rotation (e.g., the base may be configured to perform a 180-degree rotation along its axis and back with a 24-second interval). Similarly, it may be beneficial to set the speed of each mode of movement to be equal to a distinct irrational number, such that the apparatus will not fall into a cyclical pattern (in other words, the wave or sinusoidal pattern would not be in phase). Alternatively or in conjunction, additional modes of movement may be added, such as bobbing (i.e., motion in which the assembly dips and rises along a vertical axis) or lateral movement (i.e., motion in which the assembly moves across a plane). Each mode of movement that is added may add to the spatial coverage, thus providing more image data with which to construct a digital reconstruction of the environment surrounding the camera assembly. FIG. 8b illustrates the increased spatial coverage produced by the introduction of nodding motion. In embodiments in which the speed of the rotation and nodding are set separately to prevent the camera assembly from falling into a cyclical pattern, the disk of FIG. 7b, will expand into the cylinder 801 of FIG. 8b. As each additional mode of movement is added, the spatial coverage will similarly expand.

Figure 9:
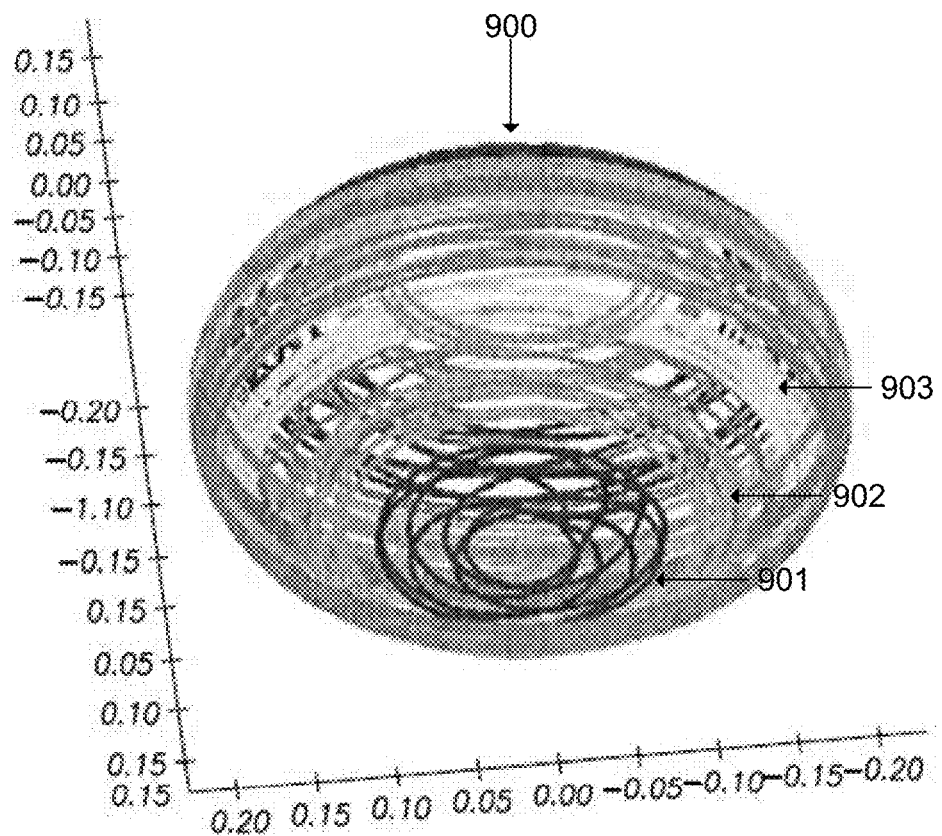
FIG. 9 illustrates an embodiment in which a camera assembly consisting of multiple cameras rotates, nods, bobs, or otherwise moves, in order to provide for heightened spatial coverage.

FIG. 9 illustrates an embodiment in which a camera assembly consisting of multiple cameras rotates, nods, bobs, or otherwise moves, in order to provide for heightened spatial coverage. In this example embodiment, the sphere 900 represents the possible spatial coverage of an assembly consisting of multiple cameras at distinct positions. Each line (e.g., 901, 902, or 903) represents the spatial coverage provided by a single camera. As the camera assembly rotates, nods, bobs, or otherwise moves, the spatial coverage provided by the cameras increases to provide spatial coverage across most of the sphere 900. In some embodiments the coverage provided by any one camera may overlap or intersect with the coverage provided by another camera.

Figure 10:
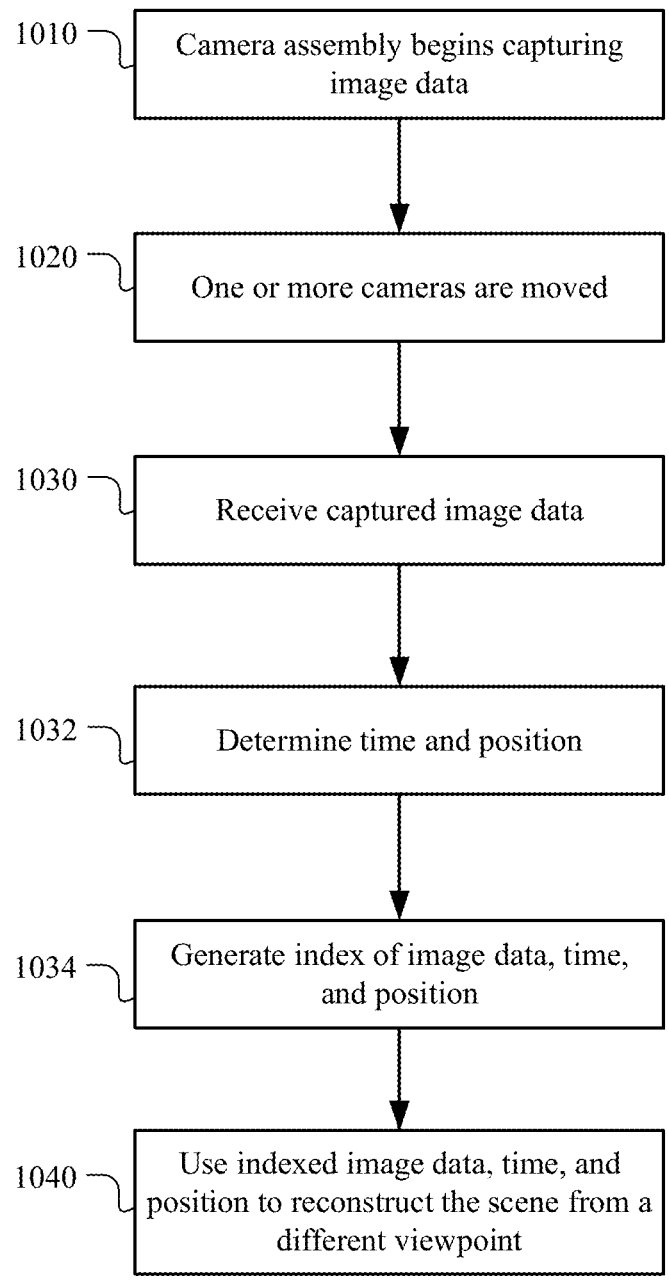
FIG. 10 illustrates an example method for producing a digital reconstruction of an environment.

FIG. 10 illustrates an example method 1000 for producing a digital reconstruction of an environment. The method may begin at step 1010, where a camera assembly, comprising at least one but possibly any number of cameras, begins capturing image data. The camera assembly may additionally comprise an actuator configured to change positions of the one or more camera devices. As described in this application, a camera may include any image capture device, including a still photo camera, a video camera, or any other type of image capture device.

At step 1020, the camera assembly is moved to increase the angular and spatial coverage of the one or more cameras as they capture image data. The captured image data may include frames that were captured while the positions of the one or more camera devices were being changed by the actuator. In some embodiments, this may include rotating, nodding (i.e., motion in which the assembly "rocks" back and forth around a horizontal axis), bobbing (i.e., motion in which the assembly dips and rises along a vertical axis), lateral movement (i.e., motion in which the assembly moves across a plane), any other mode of movement, or some combination thereof. In some embodiments the movement of the cameras may be recorded. In some embodiments this movement may be produced by controlling the position, acceleration, speed, or some combination thereof, of the camera assembly. In some embodiments, the position, acceleration, speed, or some combination thereof may be constantly altered during a filming session to optimize the number viewpoints covered within any period of time. In other embodiments, the camera assembly may alter position, acceleration, speed, or some combination thereof such that the camera assembly follows a repetitive or cyclical pattern or path, the pattern or path being configured to maximize the angular and spatial coverage of the one or more cameras of the camera assembly.

At step 1030, the captured image data (e.g., video frames) from the one or more cameras may be recorded by the one or more cameras and received by the computing system. At step 1032, embodiments of the invention may then determine, for each frame of the image data, a time at which the frame was captured by one of the one or more cameras, and a position of that camera at the time that the frame was captured. Additionally, some embodiments may determine any other data associated with the camera, the actuator, or the captured image data. At step 1034, embodiments of the invention may generate an index for the captured image data, in which each frame of the captured image data is indexed based on the determined time, position, or any other data associated with that frame. The captured image data may be indexed such that each frame of the captured image data may be searchable or recallable based on the values of the associated data. For example, if image data covering a particular portion of an environment is desired, a computing system may search the captured image data and return the image data from the camera which was best positioned to capture the desired portion of the environment. In embodiments where image data is captured over a time period, queries may be based on both time and position. For example, if image data from a camera pointing as close to possible in an upwards direction at an exact moment in time is desired, the computing system may perform a search based on the desired time and position to return the image data from the camera which was pointing as close to directly upwards at that moment in time as possible.

At step 1040, embodiments of the invention may produce a reconstruction of the environment surrounding the camera assembly when the image data was captured. In some embodiments, this may comprise querying the index of image data to query the pixel collected by a particular camera at a particular position and time as needed. In some embodiments, the index for the captured image data may be configured to be used for reconstructing the scene from a viewpoint different from any of the positions of the cameras. The reconstructed scene may be based on one or more captured image data frames, which may be queried using the index, the desired viewpoint, and the time. For example, when producing a digital reconstruction of the environment surrounding the camera assembly, a particular viewpoint, from which the environment will be viewed may be selected or provided. The system may then project a ray between that viewpoint and a surface in the environment for which captured image data is desired. Based on the ray's trajectory, the system may use the index of image data and associated metadata to identify a particular camera that was at the best place and best time to capture a pixel which coincides with the ray. Using the frame captured by the camera at that place and time, the system may retrieve the pixel of interest based on the ray's continued trajectory through the camera (or the viewpoint from which the frame was captured) and into the frame. This process may be repeated for each point of interest in the environment from the viewpoint of interest, with the index returning the best possible pixel for the point of interest based on the time that the image data was captured and the position of the one or more cameras. In some embodiments, the one or more cameras may not be able to produce a pixel which is sufficiently close to the desired pixel. For example, if the camera assembly were located in a room with several pillars and the assembly was rotated, the surfaces behind those pillars may not have associated image data since they are not visible from the viewpoints of the cameras. As a result, if a viewer moves to a position at which the hidden surfaces should be visible, the system may need to interpolate or extrapolate based on the available captured image data to produce best possible approximation of the surface behind the pillars. Similarly, if there is a moving surface within the environment, the one or more cameras may not have image data which corresponds to each position of the moving surface. Embodiments of this invention seek to reduce the amount of interpolation or extrapolation necessary, by employing one or more cameras which move, thereby allowing the cameras to increase the spatial and angular coverage.

Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for producing a digital reconstruction of an environment including the particular steps of the method of FIG. 10, this disclosure contemplates any suitable method for producing a digital reconstruction of an environment including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Figure 11:
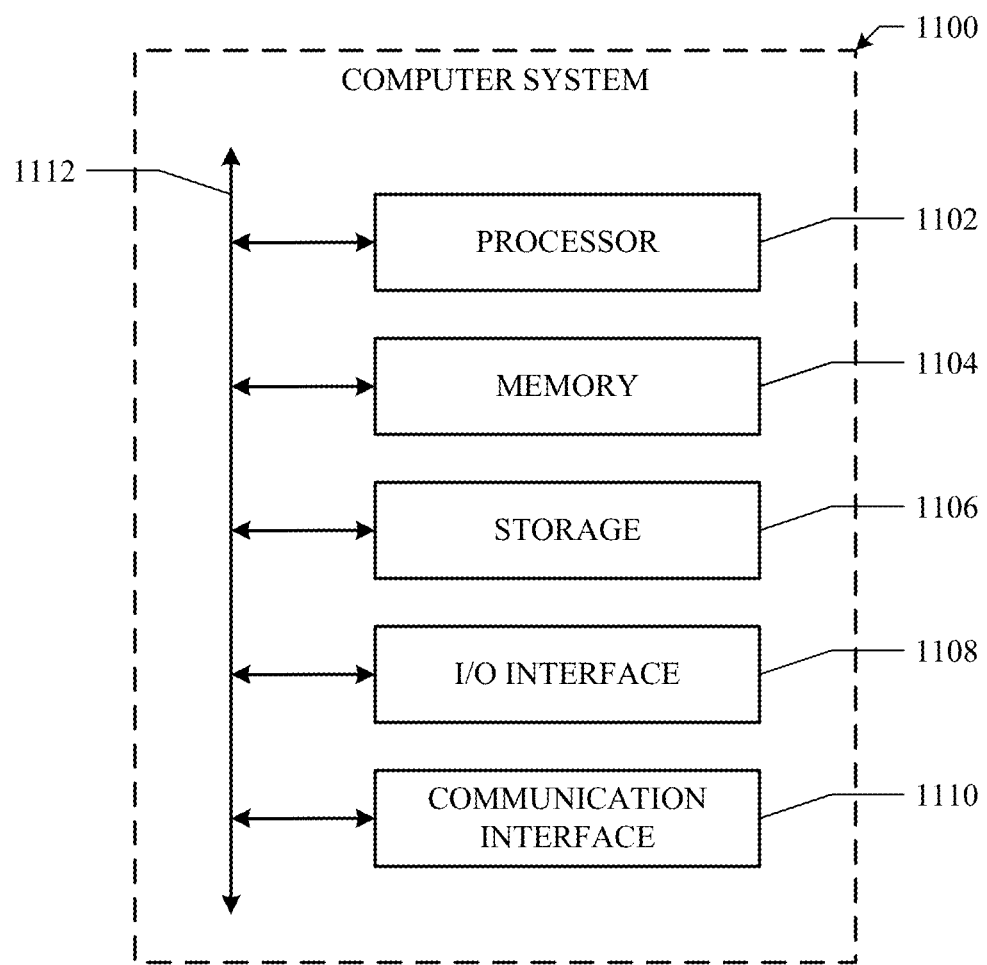
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an assembly or system or a component of an assembly or system being adapted to, arranged to, capable of, configured to, enabled to, operable to, or operative to perform a particular function encompasses that assembly, system, component, whether or not it or that particular function is activated, turned on, or unlocked, as long as that assembly, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:
1. A method comprising, by a computing system:
receiving frames of a scene captured by a plurality of physical camera devices;
determining, for each of the frames, a time at which the frame was captured by one of the plurality of physical camera devices and a camera position of that physical camera device at the time when the frame was captured;

determining a viewpoint of a virtual camera and a corresponding time of interest, wherein the virtual camera has a virtual position that is different from any of the camera positions associated with the frames; and generating an image of the scene at the time of interest from the viewpoint of the virtual camera, wherein at least one pixel of the image is generated by:

projecting a ray from the virtual position of the virtual camera through a pixel location associated with the pixel in a virtual screen of the virtual camera;

identifying, based on the ray and the camera positions of the plurality of physical camera devices at the time of interest, a particular physical camera device of the plurality of physical camera devices having a field of view that intersects the ray; and obtaining, based on the ray and the field of view of the particular physical camera device, a color value for the pixel of the image from the frame captured by the particular physical camera device at the time of interest.

2. The method of claim 1, wherein each of the plurality of physical camera devices is fixed at a distinct and known location with respect to each of the other physical camera devices in the plurality of physical camera devices.

3. The method of claim 1, further comprising, prior to receiving the frames of the scene, instructing the plurality of physical camera devices to capture the frames of the scene while changing the camera position of at least one of the plurality of physical camera devices, wherein changing the camera position of at least one of the plurality of physical camera devices comprises changing the camera position of at least one of the plurality of physical camera devices according to a known path, the known path configured to maximize the angular and spatial coverage of the environment surrounding the camera assembly.

4. The method of claim 3, wherein changing the camera position of at least one of the plurality of physical camera devices comprises changing the speed at which at least one of the plurality of physical camera devices move.

5. The method of claim 4, wherein changing the speed at which at least one of the plurality of physical camera devices move comprises:

changing a first speed, the first speed corresponding to a first mode of movement, the first mode of movement being one of nodding, bobbing, or moving laterally;

changing a second speed, the second speed corresponding to a second mode of movement, the second mode of movement being different than the first mode of movement, the second mode of movement being one of nodding, bobbing, or moving laterally.

6. The method of claim 1, wherein identifying the particular physical camera device comprises:

querying an index of image data, wherein the index comprises the frames of the scene and the determined time and the determined camera position associated with each of the frames.

7. The method of claim 6, wherein the index further comprises:

a position of each of the plurality of physical camera devices with respect to a position of each of the other physical camera devices in the plurality of physical camera devices at the determined time associated with each of the frames;

a position of each of the plurality of physical camera devices with respect to an object of interest in the scene at the determined time associated with each of the frames;

a speed of each of the plurality of physical camera devices at the determined time associated with each of the frames; or an acceleration of each of the plurality of physical camera devices at the determined time associated with each of the frames.

8. One or more computer-readable non-transitory storage media embodying software that is operable when executed to:

receive frames of a scene captured by a plurality of physical camera devices;

determine, for each of the frames, a time at which the frame was captured by one of the plurality of physical camera devices and a camera position of that physical camera device at the time when the frame was captured;

determine a viewpoint of a virtual camera and a corresponding time of interest, wherein the virtual camera has a virtual position that is different from any of the camera positions associated with the frames; and generate an image of the scene at the time of interest from the viewpoint of the virtual camera, wherein the software is operable when executed to generate at least one pixel of the image by:

projecting a ray from the virtual position of the virtual camera through a pixel location associated with the pixel in a virtual screen of the virtual camera;

identifying, based on the ray and the camera positions of the plurality of physical camera devices at the time of interest, a particular physical camera device of the plurality of physical camera devices having a field of view that intersects the ray; and obtaining, based on the ray and the field of view of the particular physical camera device, a color value for the pixel of the image from the frame captured by the particular physical camera device at the time of interest.

9. The media of claim 8, wherein each of the plurality of physical camera devices is fixed at a distinct and known location with respect to each of the other physical camera devices in the plurality of physical camera devices.

10. The media of claim 8, wherein the software is operable when executed to, prior to receiving the frames of the scene, instructing the plurality of physical camera devices to capture the frames of the scene while changing the camera position of at least one of the plurality of physical camera devices, wherein changing the camera position of at least one of the plurality of physical camera devices comprises changing the camera position of at least one of the plurality of physical one or more camera devices according to a known path, the known path configured to maximize the angular and spatial coverage of the environment surrounding the camera assembly.

11. The media of claim 10, wherein changing the camera position of at least one of the plurality of physical camera devices comprises changing the speed at which at least one of the plurality of physical camera devices move.

12. The media of claim 11, wherein changing the speed at which at least one of the plurality of physical camera devices move comprises:

changing a first speed, the first speed corresponding to a first mode of movement, the first mode of movement being one of nodding, bobbing, or moving laterally;

changing a second speed, the second speed corresponding to a second mode of movement, the second mode of movement being different than the first mode of movement, the second mode of movement being one of nodding, bobbing, or moving laterally.

13. The media of claim 8, wherein the software is operable when executed to identify the particular physical camera device by:
    querying an index of image data, wherein the index comprises the frames of the scene and the determined time and the determined camera position associated with each of the frames.

14. The media of claim 13, wherein the index further comprises:
    a position of each of the plurality of physical camera devices with respect to a position of each of the other physical camera devices in the plurality of physical camera devices at the determined time associated with each of the frames;
    a position of each of the plurality of physical camera devices with respect to an object of interest in the scene at the determined time associated with each of the frames;
    a speed of each of the plurality of physical camera devices at the determined time associated with each of the frames; or
    an acceleration of each of the plurality of physical camera devices at the determined time associated with each of the frames.

15. A system comprising:
    one or more processors; and
    one or more computer-readable non-transitory storage media coupled to one or more of the processors and comprising instructions operable when executed by one or more of the processors to cause the system to:
    receive frames of a scene captured by a plurality of physical camera devices;
    determine, for each of the frames, a time at which the frame was captured by one of the plurality of physical camera devices and a camera position of that physical camera device at the time when the frame was captured;
    determine a viewpoint of a virtual camera and a corresponding time of interest, wherein the virtual camera has a virtual position that is different from any of the camera positions associated with the frames; and
    generate an image of the scene at the time of interest from the viewpoint of the virtual camera, wherein the instructions are operable when executed by the one or more of the processors to cause the system to generate at least one pixel of the image by:
        projecting a ray from the virtual position of the virtual camera through a pixel location associated with the pixel in a virtual screen of the virtual camera;
        identifying, based on the ray and the camera positions of the plurality of physical camera devices at the time of interest, a particular physical camera device of the plurality of physical camera devices having a field of view that intersects the ray; and
        obtaining, based on the ray and the field of view of the particular physical camera device, a color value for the pixel of the image from the frame captured by the particular physical camera device at the time of interest.

16. The system of claim 15, wherein each of the plurality of physical camera devices is fixed at a distinct and known location with respect to each of the other physical camera devices in the plurality of physical camera devices.

17. The system of claim 15, wherein the one or more of the processors are operable to, prior to receiving the frames of the scene, instruct the plurality of physical camera devices to capture the frames of the scene while changing the camera position of at least one of the plurality of physical camera devices, wherein changing the camera position of at least one of the plurality of physical camera devices comprises changing the camera position of at least one of the plurality of physical camera devices according to a known path, the known path configured to maximize the angular and spatial coverage of the environment surrounding the camera assembly.

18. The system of claim 17, wherein changing the camera position of at least one of the plurality of physical camera devices comprises changing the speed at which at least one of the plurality of physical camera devices move.

19. The system of claim 18, wherein changing the speed at which at least one of the plurality of physical camera devices move comprises:
    changing a first speed, the first speed corresponding to a first mode of movement, the first mode of movement being one of nodding, bobbing, or moving laterally;
    changing a second speed, the second speed corresponding to a second mode of movement, the second mode of movement being different than the first mode of movement, the second mode of movement being one of nodding, bobbing, or moving laterally.

20. The system of claim 15, wherein the instructions are operable when executed by the one or more of the processors to cause the system to identify the particular physical camera device by:
    querying an index of image data, wherein the index comprises the frames of the scene and the determined time and the determined camera position associated with each of the frames.

21. The system of claim 20, wherein the index further comprises:
    a position of each of the plurality of physical camera devices with respect to a position of each of the other physical camera devices in the plurality of physical camera devices at the determined time associated with each of the frames;
    a position of each of the plurality of physical camera devices with respect to an object of interest in the scene at the determined time associated with each of the frames;
    a speed of each of the plurality of physical camera devices at the determined time associated with each of the frames; or
    an acceleration of each of the plurality of physical camera devices at the determined time associated with each of the frames.

* * * * *